United States Patent
Peiffer et al.

(10) Patent No.: US 6,627,295 B2
(45) Date of Patent: Sep. 30, 2003

(54) COEXTRUDED, BIAXIALLY ORIENTED POLYESTER FILM HAVING AT LEAST ONE MATT SIDE

(75) Inventors: Herbert Peiffer, Mainz (DE); Stefan Bartsch, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 09/950,455

(22) Filed: Sep. 10, 2001

(65) Prior Publication Data

US 2002/0068158 A1 Jun. 6, 2002

(30) Foreign Application Priority Data

Oct. 14, 2000 (DE) .......................... 100 51 083

(51) Int. Cl.[7] .................. B32B 27/08; B32B 27/18; B32B 27/20; B32B 27/36; B32B 31/30
(52) U.S. Cl. ............... 428/141; 428/215; 428/336; 428/323; 428/331; 428/480; 428/910; 264/288.4; 264/290.2; 525/437; 525/444; 525/448
(58) Field of Search .................. 428/480, 910, 428/336, 212, 215, 216, 141, 323, 331; 264/290.2, 288.4; 525/437, 444, 448

(56) References Cited

U.S. PATENT DOCUMENTS

| | | |
|---|---|---|
| 3,154,461 A | 10/1964 | Johnson |
| 3,944,699 A | 3/1976 | Mathews et al. |
| 4,399,179 A | 8/1983 | Minami et al. |
| 4,568,616 A * | 2/1986 | Seifried et al. ............ 428/480 |
| 5,073,435 A | 12/1991 | Eyraud et al. |
| 6,130,278 A * | 10/2000 | Hibiya et al. ............ 524/322 |
| 6,238,782 B1 * | 5/2001 | Hellmann et al. ...... 264/171.11 |
| 2002/0068159 A1 * | 6/2002 | Peiffer et al. ............ 428/220 |
| 2002/0071945 A1 * | 6/2002 | Peiffer et al. ............ 428/220 |

FOREIGN PATENT DOCUMENTS

| | | | |
|---|---|---|---|
| DE | 2 353 347 A | 5/1974 | |
| EP | 0 053 498 A2 | 6/1982 | |
| EP | 0 144 878 A2 | 6/1985 | ............ C08J/7/04 |
| EP | 0 347 646 A2 | 12/1989 | |
| EP | 0 976 548 A2 | 2/2000 | |

* cited by examiner

Primary Examiner—Vivian Chen
(74) Attorney, Agent, or Firm—ProPat, L.L.C.

(57) ABSTRACT

The invention relates to a biaxially oriented polyester film having at least one matt side and composed of at least one base layer (B) and of, applied to this base layer, at least one matt outer layer (A) which comprises at least 70% by weight of thermoplastic polyester and also to a pigment system with narrow grain size distribution. The invention further relates to the use of the film and to a process for its production. The film of the invention with the outer layer (A) has a characteristic matt surface and characteristic optical properties and has good suitability for use as a packaging film or for industrial applications.

23 Claims, 2 Drawing Sheets

COEXTRUDED, BIAXIALLY ORIENTED POLYESTER FILM HAVING AT LEAST ONE MATT SIDE

BACKGROUND OF THE INVENTION

1. Field of the Invention

Figure 1:
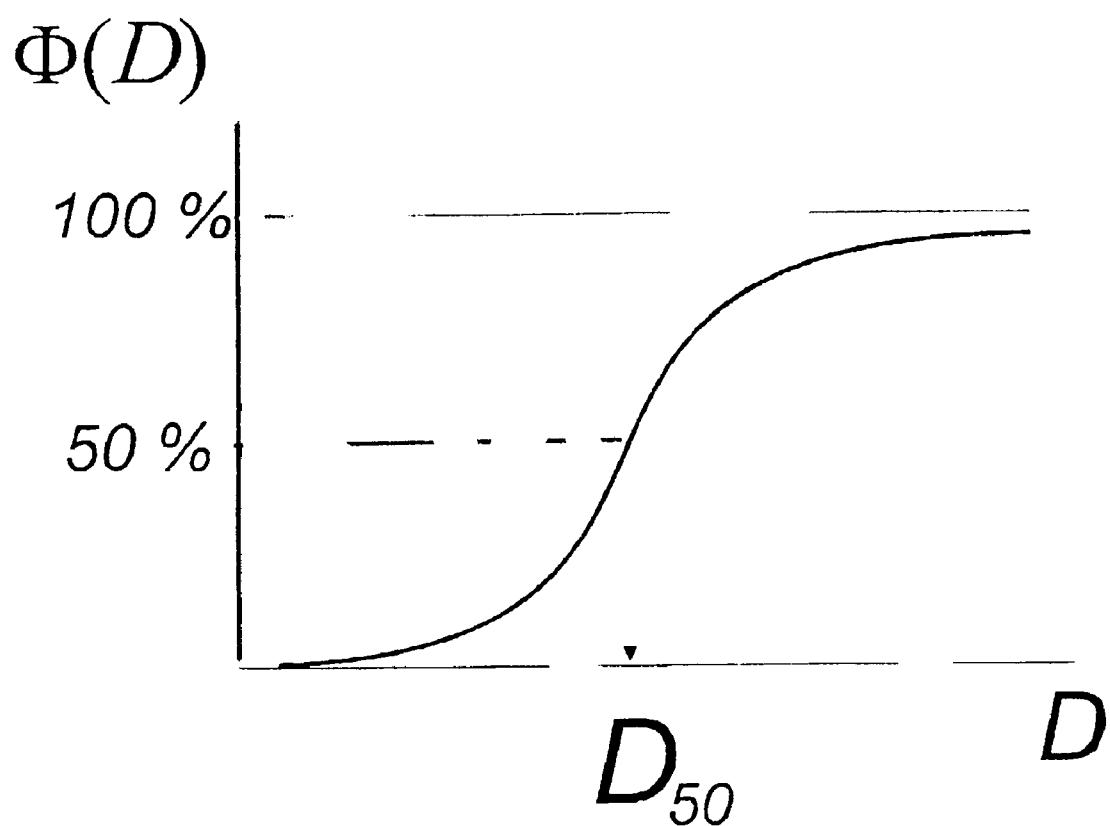

The invention relates to a coextruded, biaxially oriented polyester film having at least one matt side and composed of at least one base layer (B) which comprises at least 70% by weight of thermoplastic polyester, and of, applied to the base layer (B), at least one matt outer layer (A). The invention further relates to the use of this film and to a process for its production.

2. Description of the Related Art

The outer layer (A) of the invention has a characteristic matt surface and characteristic optical properties and has good suitability for use as a packaging film or for industrial applications.

The packaging industry has a high requirement for transparent, high-gloss plastic films, e.g. biaxially oriented polypropylene films or biaxially oriented polyester films. In addition, there is increasing requirement for transparent films of this type in which at least one surface layer is not high-gloss but has a characteristic matt appearance giving, for example, the packaging an appearance which is particularly attractive and therefore effective for promotional purposes.

EP 347 646 describes a biaxially oriented polyester film which has at least one outer layer (A) which comprises a filler at a concentration of from 0.5 to 50%, the diameter of this filler having a particular relationship to the thickness of the outer layer. The outer layer also has a certain thickness and has a certain degree of crystallinity determined with the aid of Raman spectroscopy. The topography of the outer layer A makes the film particularly suitable for magnetic recording tapes. The specification gives no information about the gloss achieved for the outer layer A. A film produced (Example 1) in accordance with EP 347 646 did not have the desired matt surface. The gloss of this surface is outside the range claimed in this specification.

EP-A-0 053 498 describes a biaxially oriented polyester film having more than one layer and having a transparent base layer and, on at least one side of this layer, another layer of matt appearance. The layer of matt appearance essentially consists of an ethylene terephthalate copolyester whose copolymer comprises from 1 to 20 mol % of

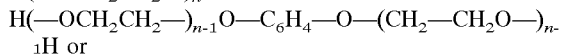
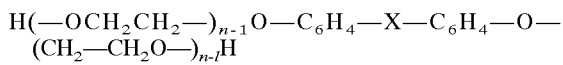

(n being an integer from 2 to 140, and X being —$CH_2$—, —$C(CH_3)_2$— or —$SO_2$—) and inert organic particles with median diameter from 0.3 to 20 μm at a concentration of from 3 to 40%, based on the layer of matt appearance. The film has a high level of mattness (gloss below 15), and transparency which is within the bounds of acceptability for specific applications (above 60%). A disadvantage of this film is that if the structure is ABA it is not printable and if the structure is AB it is not processible (on high-speed machinery). In addition, the film has shorcomings in production and its haze level is too high for many applications.

Likewise known from the prior art are matt, biaxially oriented polyester films of milky appearance.

DE-A 23 53 347 describes a process for producing a milky polyester film having one or more layers, which comprises preparing a mixture made from particles of a linear polyester with from 3 to 27% by weight of a homopolymer or copolymer of ethylene or propylene, extruding the mixture as a film, quenching the film, and orienting the same by orientation in directions running perpendicular to one another, and heat-setting the film. A disadvantage of the process is that it is not possible to reuse the cut material arising during production of the film (essentially a mixture of polyester and ethylene copolymer or propylene copolymer) as regrind without yellowing of the film. This makes the process uneconomic, and the yellowish film produced with regrind was unacceptable to the market. On increasing the concentration of the copolymer in the polyester, the film generally loses its milky character and becomes white with high opacity.

U.S. Pat. No. 3,154,461 claims a process for producing a biaxially oriented matt-surface film from thermoplastic (e.g. polyethylene terephthalate, polypropylene), in which the film comprises incompressible particles (e.g. calcium carbonate, silicon dioxide) with size of from 0.3 to 20 μm and at a concentration of from 1 to 25%. The application concerned also claims the matt film produced by the process given therein. However, the haze level of the film produced by the process of the U.S. patent is too high for many applications.

It was therefore an object of the present invention to provide a biaxially oriented polyester film having at least one matt side and not having the disadvantages of the prior art films mentioned, and having in particular an excellent degree of mattness together with good transparency, very high ease of production and very good processibility. In addition, care should be taken that the film can also be processed on high-speed machinery. It should moreover be ensured that cut material occurring during film production can be reintroduced into the production process as regrind during production of the film in amounts of up to 60% by weight, based on the total weight of the film, without any significant adverse effect on the physical or optical properties of the film.

SUMMARY OF THE INVENTION

According to the invention, the object is achieved by providing a biaxially oriented polyester film having at least one matt side and having at least one base layer (B) which comprises at least 70% by weight of thermoplastic polyester and has at least one matt outer layer (A), where the matt outer layer (A) comprises a pigment system which is characterized by the following features a) the median diameter of the pigment grains ($d_{50}$) is in the range from 2 to 5 μm
b) the spread of the distribution of the grain size of the pigment grains, expressed via the SPAN 98, is less than or equal to 1.9, and
c) the concentration of the pigment grains is in the range from 1.0 to 10% by weight.

BRIEF DESCRIPTION OF FIGS.

Figure 2:
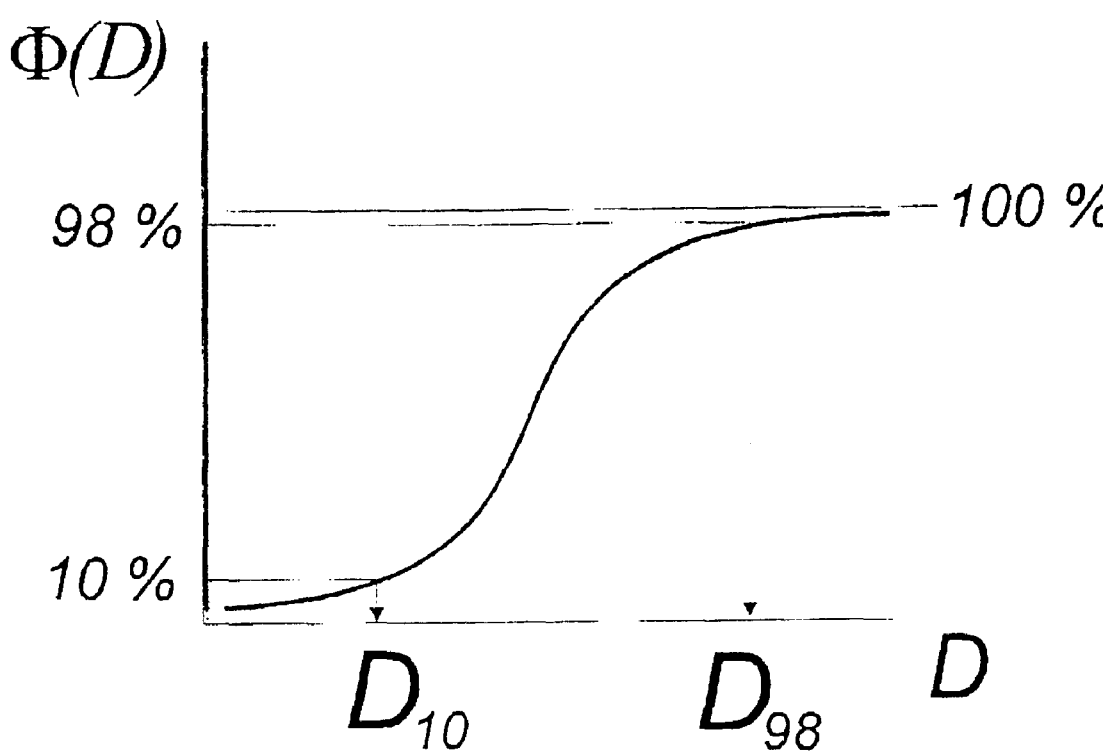

FIGS. 1 and 2 are graphs illustrating the methods of calculating the median particle diameter $d_{50}$ and the SPAN 98, respectively.

DETAILED DESCRIPTION OF THE INVENTION

According to the invention, the film has at least two layers, the layers then encompassing the base layer (B) and the matt outer layer (A).

At least 80% by weight of the base layer (B) of the film is preferably composed of a thermoplastic polyester. Polyesters suitable for this purpose are those made from ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid (poly-1,4-cyclohexanedimethylene terephthalate, PCDT), or else made from ethylene glycol, naphthalene-2,6-dicarboxylic acid and biphenyl-4,4'-dicarboxylic acid (polyethylene 2,6-naphthalate bibenzoate, PENBB). Particular preference is given to polyesters at least 90 mol %, preferably at least 95 mol %, of which is composed of ethylene glycol units and terephthalic acid units, or of ethylene glycol units and naphthalene-2,6-dicarboxylic acid units. In one particularly preferred embodiment, the base layer is composed of polyethylene terephthalate homopolymer. The remaining monomer units derive from those other aliphatic, cycloaliphatic or aromatic diols and, respectively, dicarboxylic acids which can also be present in layer (A).

Other examples of suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—$C_6H_4$—X—$C_6H_4$—OH, where X is —$CH_2$—, —$C(CH_3)_2$—, —$C(CF_3)_2$—, —O—, —S— or —$SO_2$—. Bisphenols of the formula HO—$C_6H_4$—$C_6H_4$—OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the $C_3$–$C_1$ g alkanediacids are particularly suitable, and the alkane moiety here may be straight-chain or branched.

One way of preparing the polyesters is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well-known polycondensation catalysts, such as antimony trioxide or titanium salts. Another equally good preparation method is the direct esterification process in the presence of polycondensation catalysts. This starts directly from the dicarboxylic acids and the diols.

The outer layer (A) and any other outer layers may in principle use polymers which are the same as those used for the base layer (B). Besides these, there may also be other materials present in the outer layers, and in this case the outer layer(s) is/are preferably composed of a mixture of polymers or of a copolymer or of a homopolymer which comprises ethylene isophthalate units and/or ethylene 2,6-naphthalate units and/or ethylene terephthalate units. Up to 10 mol % of the polymers may be composed of other comonomers.

To achieve the desired mattness or the desired degree of mattness, the outer layer (A) also comprises an amount in the range from 1.0 to 10.0% by weight, based on the weight of the outer layer (A), of the abovementioned pigment system. In the preferred embodiment of the film of the present invention, the amount of pigment is in the range from 1.1 to 7.5% by weight, in the particularly preferred embodiment from 1.2 to 5.0% by weight, and essentially depends on the optical properties to be achieved in the film.

Typical particle systems advantageous for the degree of mattness of the film are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin or crosslinked polymer particles, e.g. polystyrene particles or acrylate particles.

It is also possible to select mixtures of two or more different particle systems, or mixtures of particle systems of the same chemical makeup but of different particle size. The particles may be added to the polyester of the outer layer (A) or of the other outer layer of the film in the respective advantageous concentrations, e.g. as a glycolic dispersion during the polycondensation, or by way of masterbatches during extrusion.

Preferred particles are $SiO_2$ in colloidal or in chain-type form. These particles give very good incorporation into the polymer matrix.

It has been found that the median particle diameter and the scatterband of the pigment system used have a decisive effect on the degree of mattness and the production of the film.

To achieve a very high degree of mattness (i.e. very low gloss) and to achieve good ease of production, the outer layer (A) of the film according to the present invention comprises a pigment system in which the median diameter of the pigment grains (the $d_{50}$ value) is in the range from 2.0 to 5.0 $\mu$m, and in which the spread of the distribution of the grain size of the pigment grains (expressed via the SPAN 98) is less than or equal to 1.9.

In the preferred embodiment, the outer layer (A) of the film of the present invention comprises a pigment system in which the median diameter of the pigment grains is in the range from 2.1 to 4.9 $\mu$m and the spread of the distribution of the grain size of the pigment grains is less than or equal to 1.8. In the particularly preferred embodiment, the outer layer (A) of the film of the present invention comprises a pigment system in which the median diameter of the pigment grains is in the range from 2.2 to 4.8 $\mu$m, and the spread of the distribution of the grain size of the pigment grains is less than or equal to 1.7.

Where, on the other hand, the outer layer (A) of the film comprises a pigment system in which the median diameter and the spread are outside the inventive range, this has a persistently adverse effect on the mattness and/or ease of production of the film.

Where, on the other hand, the outer layer (A) of the film comprises a pigment system in which the median diameter is greater than 5.0 $\mu$m and the spread is greater than 1.9, the mattness and ease of production of the film become poorer, i.e. the gloss is undesirably increased and the film tends to suffer increased incidence of tears during production.

Where, on the other hand, the outer layer (A) of the film comprises a pigment system in which the median diameter is less than 2.0 $\mu$m and the spread is greater than 1.9, again the mattness and ease of production of the film become poorer, i.e. the gloss is undesirably increased and the film tends to suffer increased incidence of tears during production.

In a particular embodiment of the invention, the outer layer (A) comprises, besides the ethylene terephthalate homopolymer or the ethylene terephthalate copolymer, another polymeric component 1. This component I is a copolyester composed of the condensation product of the following monomers or of their derivatives capable of forming polyesters:

a) from 65 to 95 mol % of isophthalic acid;
b) from 0 to 30 mol % of at least one aliphatic dicarboxylic acid having the formula $HOOC(CH_2)_nCOOH$, where n is in the range from 1 to 11;
c) from 5 to 15 mol % of at least one sulfomonomer containing an alkali metal sulfonate group on the aromatic moiety of a dicarboxylic acid;
d) a copolymerizable aliphatic or cycloaliphatic glycol having from 2 to 11 carbon atoms, in the stoichiometric amount necessary to form 100 mol % of condensate;

where each of the percentages is based on the total amount of monomers forming component I. For a detailed description of component I see also EP-A-0 144 878, which is expressly incorporated herein by way of reference.

Component I is advantageously added as another polymeric component of the outer layer (A), and its proportion may be up to 30% by weight, based on the weight of the outer layer (A). In this case component I forms a blend or a mixture with the other polymers present in this layer, or else forms a copolymer by transesterification during extrusion.

For the purposes of the present invention, mixtures are mechanical mixtures prepared from the individual components. For this, the individual constituents are generally combined in the form of small-dimensioned compressed moldings, e.g. lenticular or bead-shaped pellets, and mixed with one another mechanically, using a suitable agitator. Another way of producing the mixture is to feed the component I and the appropriate polymer for the respective layer separately to the extruder for the base layer or other layer, and to carry out mixing in the extruder and/or in the downstream systems for transporting the melt.

For the purposes of the present invention, a blend is an alloy-like composite of the individual components which can no longer be separated into the initial constituents. A blend has properties like those of a homogeneous material and can therefore be characterized by appropriate parameters.

In one advantageous embodiment, the matt outer layer (A) is characterized by the following set of parameters:

a) the film has a roughness expressed in terms of its $R_a$ value in the range from 150 to 1000 nm, preferably from 175 to 950 nm, particularly preferably from 200 to 900 nm. Values below 150 nm have an adverse effect on the degree of mattness of the surface, and values above 1000 nm impair the optical properties of the film.
b) The value measured for gas flow is in the range from 0 to 50 s, preferably in the range from 0 to 45 s. At values above 50, the degree of mattness of the film is adversely affected.

The base layer (B) may likewise also comprise conventional additives, such as stabilizers and/or pigments (=fillers). Examples of stabilizers advantageously used are phosphorus compounds, such as phosphoric acid or phosphoric esters.

Typical pigments (fillers) for the base layer (B) are the inorganic and/or organic particles given for the outer layer (s), for example calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin or crosslinked polystyrene particles or crosslinked acrylate particles.

In one particularly advantageous embodiment, the base layer (B) comprises only the pigments introduced via the regrind. This method produces a film with particularly low haze.

In the advantageous usage form, the film is composed of three layers, the base layer (B) and, applied to the two sides of this base layer (B), outer layers (A) and (C), the outer layer (A) being matt and comprising the abovementioned pigment system.

Between the base layer (B) and the outer layers there may, if desired, also be an intermediate layer. This may again be composed of the polymers described for the base layer (B). In one particularly preferred embodiment, the intermediate layer is composed of the polyester used for the base layer (B). The intermediate layer may also comprise the customary additives described. The thickness of the intermediate layer is generally above 0.3 μm, preferably in the range from 0.5 to 15 μm, in particular in the range from 1.0 to 10 μm and particularly preferably in the range from 1.0 to 5 μm.

In the particularly advantageous three-layer embodiment of the novel film, the thickness of the outer layers (A) and (C) is generally in the range from 0.1 to 5.0 μm, preferably in the range from 0.2 to 4.5 μm, and particularly preferably in the range from 0.3 to 4.0 μm, and the thicknesses of the outer layer (A) here may be the same as, or differ from, that of the outer layer (C).

The total thickness of the novel polyester film may vary within certain limits. It is from 3 to 80 μm, in particular from 4 to 50 μm, preferably from 5 to 30 μm, the base layer (B) preferably making up from 5 to 97% of the total thickness.

The polymers for the base layer (B) and the two outer layers (A) and (C) are fed to three extruders for production of the film. Any foreign bodies or contamination present may be removed from the polymer melt by suitable filters prior to extrusion. The melts are then extruded through a coextrusion die to give flat melt films and are layered one upon the other. The composite film is then drawn off and solidified with the aid of a chill roll and other rolls where appropriate.

The invention thus also provides a process for producing the polyester film of the invention by coextrusion.

The procedure for this process is that the melts corresponding to the individual layers (A), (B) and (C) of the film are coextruded through a flat-film die, the resultant film is drawn off for solidification on one or more rolls, the film then biaxially stretched (oriented), and the biaxially stretched film is heat-set and, if desired, corona- or flame-treated on the surface layer intended for treatment.

The biaxial stretching (orientation) is generally carried out sequentially, and preference is given to sequential biaxial stretching in which stretching is first longitudinal (in the machine direction) and then transverse (perpendicular to the machine direction).

As is usual in coextrusion, the polymer or the polymer mixture for the individual layers is first compressed and plasticized in an extruder, and any additives used may already be present in the polymer or the polymer mixture. The melts are then simultaneously extruded through a flat-film die (slot die), and the coextruded melt is drawn off on one or more take-off rolls, whereupon the melt cools and solidifies to form a prefilm.

The biaxial orientation is generally carried out sequentially, preferably orienting first longitudinally (i.e. in the machine direction=MD) and then transversely (i.e. perpendicularly to the machine direction=TD). This gives orientation of the polymer chains. The longitudinal orientation can be carried out with the aid of two rolls running at different speeds corresponding to the desired stretching ratio. For the transverse orientation use is generally made of an appropriate tenter frame, clamping both edges of the film and then drawing toward the two sides at an elevated temperature.

The temperature at which the orientation is carried out may vary over a relatively wide range and depends on the film properties desired. The longitudinal stretching is generally carried out at from about 80 to 130° C., and the transverse stretching at from about 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. Prior to the transverse stretching, one or both surfaces of the film may be in-line coated by known processes. The in-line coating may serve, for example, to give improved adhesion of a metal layer or of any printing ink subsequently to be applied, or else to improve antistatic performance or processing performance.

For producing a film with a very high degree of mattness (=very low gloss) and improved transparency, it has proven favorable for the planar orientation $\Delta p$ of the film to be less than 0.170, preferably less than 0.168 and very preferably less than 0.166. In this instance, the strength of the film in the direction of its thickness is sufficiently great that when the seal seam strength is measured it is specifically the seal seam which is pulled apart, and there is no initiation or propagation of tearing within the film.

The significant variables affecting the planar orientation $\Delta p$ have been found to be the longitudinal and transverse stretching parameters, and also the SV of the raw material used. The processing parameters include in particular the longitudinal and transverse stretching ratios ($\lambda_{MD}$ and $\lambda_{TD}$), the longitudinal and transverse stretching temperatures ($T_{MD}$ and $T_{TD}$), the film web speed and the nature of the stretching, in particular that in the longitudinal direction of the machine. For example, if a machine gives a planar orientation $\Delta p=0.171$ with the following set of parameters: $\lambda_{MD}=4.8$ and $\lambda_{TD}=4.0$, and longitudinal and transverse stretching temperatures $T_{MD}$=from 80 to 118° C. and $T_{TD}$= from 80 to 125° C., then increasing the longitudinal stretching temperature to $T_{MD}$=from 80 to 125° C., or increasing the transverse stretching temperature to $T_{TD}$=from 80 to 135° C., or lowering the longitudinal stretching ratio to $\lambda_{MD}=4.3$, or lowering the transverse stretching ratio to $\lambda_{TD}=3.7$ gives a planar orientation $\Delta p$ within the desired range. The film web speed here is 340 m/min, and the SV of the material is about 730. In the case of longitudinal stretching, the data specified are based on what is known as N-TEP stretching, which is composed of a low-orientation stretching step (LOE=low-orientation elongation) and of a high-orientation stretching step (REP=rapid elongation process). With other stretching systems, the conditions are in principle the same, but the values for the respective process parameters may be slightly different. In the case of longitudinal stretching, the temperatures given are based on the respective roll temperatures, and in the case of transverse stretching they are based on the film temperatures measured by IR.

In the heat-setting which follows, the film is held for from 0.1 to 10 s at a temperature of from 150 to 250° C. The film is then wound up in a conventional manner.

One or both surfaces of the film is/are preferably corona- or flame-treated by one of the known methods after biaxial stretching. The intensity of treatment is adjusted so as to give surface tension in the range above 45 mN/m.

The film may also be coated to establish other desired properties. Typical coatings are layers with adhesion-promoting, antistatic, slip-enhancing or release effect. It is, of course, possible for these additional layers to be applied to the film by in-line coating using aqueous dispersions prior to the transverse stretching step.

The film of the invention, having one matt side, has excellent optical properties, i.e. low gloss and high transparency, very good handling, and very good processing performance.

In addition, it has been ensured that the relatively large amounts of cut material arising during film production can be reintroduced to the extrusion process as regrind during production of the film in amounts of from 20 to 60% by weight, based on the total weight of the film, without any significant adverse effect on the physical properties of the film, in particular its appearance.

The film therefore has excellent suitability for use in flexible packaging and specifically wherever its excellent optical properties and its good processability are of particular importance, as particularly in its use on high-speed packaging machinery.

The table below (Table 1) gives once again a quick overview of the most important film properties of the invention.

TABLE 1

|  | Range of the invention | Preferred | Particularly preferred | Unit | Test method |
|---|---|---|---|---|---|
| OUTER LAYER A |  |  |  |  |  |
| Gloss, 60° | <80 | <70 | <60 |  | DIN 67530 |
| COF | <0.6 | <0.5 | <0.40 |  | DIN 53375 |
| Average roughness $R_a$ | 150–1000 | 175–950 | 200–900 | [nm] | DIN 4768, cutoff of 0.25 mm |
| Range of value measured for gas flow Other film properties | 0–50 | 0–45 |  | [sec] | internal |
| Haze | <50 | <45 | <40 | [%] | ASTM D 1003-52 |
| Planar orientation (optional) | <0.170 | <0.168 | <0.165 |  | internal |

The following test methods were utilized for the purposes of the present invention to characterize the raw materials and the films:

SV (Standard Viscosity)

Standard viscosity SV (DCA) is measured in dichloroacetic acid by a method based on DIN 53726.

Intrinsic viscosity (IV) is calculated as follows from standard viscosity IV (DCA)=$6.907 \cdot 10^{-4}$ SV (DCA)+ 0.063096

Coefficient of Friction (COF)

Coefficient of friction was determined to DIN 53 375. The coefficient of sliding friction was measured 14 days after production.

Surface Tension

Surface tension was determined by what is known as the ink method (DIN 53 364).

Haze

Hölz haze was measured by a method based on ASTM-D 1003-52 but, in order to utilize the most effective measurement range, measurements were made on four pieces of film laid one on top of the other, and a 1° slit diaphragm was used instead of a 4° pinhole.

Gloss

Gloss was determined to DIN 67 530. Reflectance was measured, as an optical value characteristic of a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

Surface Gas Flow Time

The principle of the test method is based on the air flow between one side of the film and a smooth silicon wafer sheet. The air flows from the surroundings into an evacuated space, and the interface between film and silicon wafer sheet acts as a flow resistance.

A round specimen of film is placed on a silicon wafer sheet in the middle of which there is a hole providing the connection to the receiver. The receiver is evacuated to a pressure below 0.1 mbar. The time in seconds taken by the air to establish a pressure rise of 56 mbar in the receiver is determined.

Test Conditions:

| | |
|---|---|
| Test area | 45.1 cm$^2$ |
| Weight applied | 1276 g |
| Air temperature | 23° C. |
| Humidity | 50% relative humidity |
| Aggregated gas volume | 1.2 cm$^3$ |
| Pressure difference | 56 mbar |

Determination of Planar Orientation Δp

Planar orientation is determined by measuring the refractive index with an Abbe refractometer according to internal operating prescription 24.

Preparation of Specimens:

Specimen size and length: from 60 to 100 mm

Specimen width: corresponds to prism width of 10 mm

To determine $n_{MD}$ and $n_a$ (=$n_z$), the specimen to be tested has to be cut out from the film with the running edge of the specimen running precisely in the direction TD. The specimens are to be taken from the middle of the film web. Care must be taken that the temperature of the Abbe refractometer is 23° C. Using a glass rod, a little diiodomethane (N=1.745) or diiodomethane-bromonaphthalene mixture is applied to the lower prism, which has been cleaned thoroughly before the test. The refractive index of the mixture must be greater than 1.685. The specimen cut out in the direction TD is firstly laid on top of this, in such a way that the entire surface of the prism is covered. Using a paper wipe the film is now firmly pressed flat onto the prism, so that it is firmly and smoothly positioned thereon. The excess liquid must be sucked away. A little of the test liquid is then dropped onto the film. The second prism is swung down and into place and pressed firmly into contact. The right-hand knurled screw is then used to turn the indicator scale until a transition from light to dark can be seen in the field of view in the range from 1.62 to 1.68. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record. This is the refractive index nMD in the machine direction. The scale is now turned using the lower knurled screw until the range visible in the eyepiece is from 1.49 to 1.50.

The refractive index $n_a$ or $n_z$ (in the direction of the thickness of the film) is then determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition can be seen. This sharp transition line is brought into the crossing point of the two diagonal lines using the lower knurled screw, and the value indicated on the scale is read off and entered into the table.

The specimen is then turned, and the corresponding refractive indices $n_{MD}$ and $n_a$ (=$n_z$) of the other side are measured and entered into an appropriate table.

After determining the refractive indices in, respectively, the direction MD and the direction of the thickness of the film, the specimen strip cut out in the direction MD is placed in position and the refractive indices $n_{TD}$ and $n_a$ (=$n_z$) are determined accordingly. The strip is turned over, and the values for the B side are measured. The values for the A side and the B side are combined to give average refractive indices. The orientation values are then calculated from the refractive indices using the following formulae:

$$\Delta n = n_{MD} - n_{TD}$$

$$\Delta p = (n_{MD} + n_{TD})/2 - n_Z$$

$$n_{av} = (n_{MD} + n_{TD} + n_Z)/3$$

Measurement of Median Diameter $d_{50}$

The median diameter $d_{50}$ was measured by laser on a Malvern MasterSizer by the standard method (examples of other measurement devices are the Horiba LA 500 or Sympathec Helos, which use the same principle of measurement). For the tests, the specimens were placed in a cell with water, and this was then placed into the test device. The test procedure is automatic and includes the mathematical determination of the $d_{50}$ value.

The $d_{50}$ value here is determined as defined from the (relative) cumulative particle size distribution curve: the point of intersection of the 50% ordinate with the cumulative curve directly gives the desired $d_{50}$ value on the abscissa axis. FIG. 1 (attached) illustrates exactly how the value should be determined from the curve.

Measurement of SPAN 98

The test device used to determine SPAN 98 was the same as that described above for the determination of median diameter $d_{50}$. SPAN 98 is defined here as follows:

$$SPAN98 = \frac{d_{98} - d_{10}}{d_{50}}$$

The (relative) cumulative particle size distribution curve is again used as a basis for determining $d_{98}$ and $d_{10}$. The point of intersection of the 98% ordinate value with the cumulative curve gives the desired $d_{98}$ value directly on the abscissa axis, and the point of intersection of the 10% ordinate value with the cumulative curve gives the desired $d_{10}$ value directly on the abscissa axis. FIG. 2 (attached) shows precisely how this is done.

EXAMPLE I

Chips made from polyethylene terephthalate (prepared by the transesterification process with Mn as transesterification catalyst, Mn concentration: 100 ppm) were dried at 150° C. to residual moisture below 100 ppm and fed to the extruder for the base layer (B). Chips made from polyethylene terephthalate and from a filler were likewise fed to the extruder for the non-matt outer layer (C).

Alongside this, chips were prepared from a polyethylene terephthalate (prepared by the transesterification process with Mn as transesterification catalyst, Mn concentration: 100 ppm) and dried at a temperature of 150° C. to residual moisture below 100 ppm, and fed, together with the filler of the invention, to the extruder for the matt outer layer (A).

A transparent, three-layer film of ABC structure and with a total thickness of 12 μm was then produced by coextrusion followed by stepwise longitudinal and transverse orientation. The thickness of each outer layer is given in Table 2.

Outer layer (A) was a mixture made from:

| | |
|---|---|
| 40% by weight of | polyethylene terephthalate with SV of 800 and |
| 60% by weight of | masterbatch made from 95% by weight of polyethylene terephthalate and 5.0% by weight of silica particles (® Sylysia 430 from Fuji, Japan) with $d_{50}$ value of 3.4 μm and SPAN 98 of 1.4. |

Base layer (B):
| | |
|---|---|
| 100.0% by weight of | polyethylene terephthalate with SV of 800 |

Outer layer (C) was a mixture made from:

| | |
|---|---|
| 93.0% by weight of | polyethylene terephthalate with SV of 800 and |
| 7.0% by weight of | masterbatch made from 97.75% by weight of polyethylene terephthalate, 1.0% by weight of ® Sylobloc 44 H (synethic SiO$_2$ from Grace) and 1.25% by weight of ® Aerosil TT 600 (fumed SiO$_2$ from Degussa). |

The production conditions in each step of the process were:

| Extrusion: | Temperatures | Layer A: | 270° C. |
|---|---|---|---|
| | | Layer B: | 290° C. |
| | | Layer C: | 290° C. |
| | Take-off roll temperature | | 30° C. |
| | Die width: | | 2.5 mm |

-continued

| Longitudinal stretching: | Temperature: | 80–126° C. |
|---|---|---|
| | Longitudinal stretching ratio: | 4.0 |
| Transverse stretching: | Temperature: | 80–135° C. |
| | Transverse stretching ratio: | 4.0 |
| Setting: | Temperature: | 230° C. |
| | Duration: | 3 s |

The film had the required low gloss and the required low haze. Furthermore, the film exhibited the required handling and the required processing performance. Tables 2 and 3 show the structure of the films and the properties achieved in films produced in this way.

EXAMPLE 2

The outer layer thickness of the matt outer layer (A) was raised from 1.5 to 2 μm, while the structure of the film and the method of production were otherwise as in Example 1. The result was an improvement in the degree of mattness of the film.

EXAMPLE 3

A film of 23 μm thickness was produced by comparison with Example 1. The outer layer thickness for the matt layer (A) was 2.5 μm and that for the non-matt layer (C) was 2.0 μm. The result was a film with still lower gloss. There was also a slight improvement in the handling of the film.

EXAMPLE 4

The makeup of the outer layer (A) of matt appearance was changed from that of Example 3. 20% by weight of the polyethylene terephthalate with SV value of 800 were now replaced by the polymeric component I in the matt outer layer (A). This component I had the following makeup:
a) 90 mol % of isophthalic acid;
b) 10 mol % of the sodium salt of 5-sulfoisophthalic acid.

Introducing component I into the matt outer layer (A) further improved the transparency of the film.

Outer layer (A) was a mixture made from:

| | |
|---|---|
| 20% by weight of | polyethylene terephthalate with SV value of 800 |
| 20% by weight of | component I and |
| 60% by weight of | masterbatch made from 95% by weight of polyethylene terephthalate and 5.0% by weight of silica particles (® Sylysia 430 from Fuji, Japan) with $d_{50}$ of 3.4 μm and SPAN 98 of 1.4. |

COMPARATIVE EXAMPLE 1

Unlike in Example 1, the matt outer layer (A) was now formulated with a pigment system of the prior art. The degree of mattness of the film became markedly poorer.

Outer layer (A) was a mixture made from:

| | |
|---|---|
| 40% by weight of | polyethylene terephthalate with SV value of 800; |
| 60% by weight of | masterbatch made from 95% by weight of polyethylene terephthalate and 5.0% by weight of silica particles with |

$d_{50}$ of 5.5 μm and SPAN 98 of 1.7.

TABLE 2

| Example | Film thickness μm | Film structure | Layer thicknesses μm A | B | C | Pigments in layers A | B | C | Median pigment diameter in layers μm A | B | C | Pigment concentrations ppm A | B | C |
|---|---|---|---|---|---|---|---|---|---|---|---|---|---|---|
| E 1 | 12 | ABC | 1.5 | 9 | 1.5 | Sylysia 430 | none | Sylobloc 44 H Aerosil TT 600 | 3.4 | | 2.5 0.04 | 30,000 | 0 | 700 750 |
| E 2 | 12 | ABC | 2.0 | 8.5 | 1.5 | Sylysia 430 | none | Sylobloc 44 H Aerosil TT 600 | 3.4 | | 2.5 0.04 | 30,000 | 0 | 700 750 |
| E 3 | 23 | ABC | 2.5 | 18.5 | 2.0 | Sylysia 430 | none | Sylobloc 44 H Aerosil TT 600 | 3.4 | | 2.5 0.04 | 30,000 | 0 | 700 750 |
| E 4 | 23 | ABC | 2.5 | 18.5 | 2.0 | Sylysia 430 | none | Sylobloc 44 H Aerosil TT 600 | 3.4 | | 2.5 0.04 | 30,000 | 0 | 700 750 |
| CE 1 | 12 | ABC | 1.5 | 9 | 1.5 | d50 = 5.0 | none | Sylobloc 44 H Aerosil TT 600 | 5.0 | | 2.5 0.04 | 30,000 | 0 | 700 750 |

TABLE 3

| Example | Coefficient of friction COF Side C against side C | Average roughness $R_a$ Side A | Side C | Values measure for gas flow Side A | Side C | Δp | Gloss Side A | Side C | Haze | Winding performance and handling | Processing performance |
|---|---|---|---|---|---|---|---|---|---|---|---|
| E 1 | 0.40 | 230 | 50 | 10 | 130 | 0.165 | 60 | 140 | 45 | ++ | ++ |
| E 2 | 0.40 | 250 | 50 | 10 | 130 | 0.165 | 55 | 142 | 45 | ++ | ++ |
| E 3 | 0.41 | 250 | 50 | 10 | 130 | 0.165 | 50 | 140 | 47 | ++ | ++ |
| E 4 | 0.40 | 250 | 50 | 10 | 130 | 0.165 | 50 | 140 | 47 | ++ | ++ |
| CE 1 | 0.45 | 210 | 50 | 15 | 130 | 0.165 | 70 | 140 | 55 | ++ | ++ |

Key to winding performance, handling and processing performance of films:
++: no tendency to adhere to rolls or other mechanical parts, no blocking problems on winding or during processing on packaging machinery, low production costs
+: moderate production costs
−: tendency to adhere to rolls or other mechanical parts, blocking problems on winding and during processing on packaging machinery, high production costs due to complicated handling of film in machinery

What is claimed is:

1. A biaxially oriented polyester film having at least one matt side and having at least one base layer (B) made from a thermoplastic polyester and having at least one matt outer layer (A) which comprises at least 70% by weight of thermoplastic polyester made from ethylene glycol units and from terephthalic acid units, wherein the watt layer (A) also comprises a pigment system which has the following features:

a) the median diameter ($d_{50}$) of the pigment grains is in the range from 2.1 to 4.9 μm,
    b) the spread of the distribution of the grain size of the pigment grains, expressed via the SPAN 98, is less than or equal to 1.9, and
    c) the concentration of pigment grains is in the range from 1.0 to 10% by weight, based on the weight of the outer layer (A).

2. The polyester film having at least one matt side, as claimed in claim 1, wherein the matt outer layer (A) comprises a pigment system which has a SPAN 98 less than or equal to 1.8.

3. The polyester film having at least one matt side, as claimed in claim 1, wherein the matt outer layer (A) has a thickness in the range from 0.1 to 5 μm.

4. The polyester film having at least one matt side, as claimed in claim 1, which has a total thickness in the range from 3 to 80 μm, from 5 to 97% of the total thickness being made up by the base layer (B).

5. A process for producing a polyester film having at least one matt side, as claimed in claim 1, by coextrusion, in which melts corresponding to the separate layers of the film are coextruded through a flat-film die, the resultant film is drawn off for solidification on one or more rollers to form a prefilm, the prefilm is then biaxially stretched, and the biaxially stretched film is heat-set, which comprises extruding a melt corresponding to layer (A) having a pigment system which has the following features:

a) the median diameter ($d_{50}$) of the pigment grains is in the range from 2.1 to 4.9 μm,
    b) the scattering of the distribution of the grain size of the pigment grains, expressed via the SPAN 98, is less than or equal to 1.9, and
    c) the concentration of pigment grains is in the range from 1.0 to 10% by weight, based on the total weight of the film, and carrying out the biaxial stretching by longitudinal stretching at a temperature in the range from 80 to 130° C. and a stretching ratio in the range from 2.5:1 to 6:1 and by transverse stretching at a temperature in the range from 90 to 150% and a stretching ratio in the range from 3.0:1 to 5.0:1.

6. The process as claimed in claim 5, wherein the stretching parameters are set so that the planar orientation Δp of the film is below 0.170.

7. The process as claimed in claim 5, wherein cut material arising during the process to produce the film is reintroduced to the extrusion process as regrind in amounts in the range from 20 to 60% by weight, based on the total weight of the film.

8. Flexible packaging comprising a film according to claim 1.

9. Label comprising a film according to claim 1.

10. Poster laminate comprising a film according to claim 1.

11. A polyester film according to claim 1, wherein the pigment system is present in an amount of from 1.1 to 7.5% based on the weight of the outer layer (A).

12. A polyester film according to claim 1, wherein the pigment system is $SiO_2$ particles in colloidal or chain-type form.

13. A biaxially oriented polyester film having at least one matt side and having at least one base layer (B) made from thermoplastic polyester and having at least one matt outer layer (A) which comprises at least 70% by weight of thermoplastic polyester made from ethylene glycol units and from terephthalic acid units, wherein the matt layer outer (A) also comprises a pigment system which has the following features:
   a) the median diameter ($d_{50}$) of the pigment grains is in the range from 2 to 5 μm,
   b) the spread of the distribution of the grain size of the pigment grains, expressed via the SPAN 98 is less than or equal to 1.9 and
   c) the concentration of pigment grains is in the range from 1.0 to 10% by weight, based on the weight of the outer layer (A),
said outer layer (A) comprising, besides the thermoplastic polyester, another polymeric component I which is a copolymer composed of the condensation product of the following monomers or respectively, their derivatives capable of forming polyesters:
   e) from 65 to 95 mol % of isophthalic acid
   f) from 0 to 30 mol % of at least one aliphatic dicarboxylic acid acid having the formula $HOOC(CH_2)_nCOOH$, where n is in the range 1 to 11;
   g) from 5 to 15 mol % at least one sulfomonomer containing an alkali metal sulfonate group on the aromatic moiety of a dicarboxylic acid; and
   h) a copolymerizible aliphatic or cycloaliphatic glycol having from 2 to 11 carbon atoms, in the stoichiometric amount necessary to form 100 mol % of the condensation product;
where each of the percentages is based on the total amount of all of the monomers forming component I.

14. The polyester film having at least one matt side, as claimed in claim 13, wherein the outer layer (A) comprises up to 30% by weight of component I, based on the weight of the outer layer (A).

15. A polyester film according to claim 13, wherein the outer layer (A) comprises a pigment system which has a median diameter ($d_{50}$) of the pigment grains in the range from 2.1 to 4.9 μm.

16. A biaxially oriented polyester film having at least one matt side and having at least one base layer (B) made from thermoplastic polyester and having at least one matt outer layer (A) which comprises at least 70% by weight of thermoplastic polyester made from ethylene glycol units and from terephthalic acid units, wherein the matt outer layer (A) also comprises a pigment system which has the following features:
   a) the median diameter ($d_{50}$) of the pigment grains is in the range from 2 to 5 μm,
   b) the spread of the distribution of the grain size of the pigment grains, expressed via the SPAN 98, is less than or equal to 1.9, and
   c) the concentration of pigment grains is in the range from 1.0 to 10% by weight, based on the weight of the outer layer (A),
and wherein the matt outer layer (A) has a roughness, expressed via its $R_a$ value, in the range from 150 to 1000 nm, and wherein its value measured for gas flow is in the range from 1 to 50 s.

17. A polyester film according to claim 16 wherein the pigment system has a median diameter ($d_{50}$) of the pigment grains in the range from 2.1 to 4.9 μm.

18. A biaxially oriented polyester film having at least one mat side and having at least one base layer (B) made from thermoplastic polyester and having at least one matt outer layer (A) which comprises at least 70% by weight of thermoplastic polyester, wherein at least 90 mol % of the thermoplastic polyester of which layer (B) is comprised and of the thermoplastic polyester of which layer (A) is comprised is composed of ethylene glycol units and terephthalic acid units with the remaining units being derived from other aliphatic, cycloaliphatic or aromatic diols and other aliphatic, cycloaliphatic or aromatic dicarboxylic acids, and wherein the mat outer layer (A) also comprises a pigment system which has the following features:
   a) the median diameter ($d_{50}$) of the pigment grains is in the range from 2.1 to 4.9 μm,
   b) the spread of the distribution of the grain size of the pigment grains, expressed via the SPAN 98, is less than or equal to 1.9, and
   c) the concentration of pigment grains is in the range Worn 1.0 to 10% by weight, based on the total weight of the film.

19. A polyester film according to claim 18, wherein said other aliphatic, cycloaliphatic or aromatic diols are selected from the group consisting of diethylene glycol, triethylene glycol, aliphatic glycols of the formula $HO—(CH_2)_n—OH$ where ii is an integer from 3 to 6, branched aliphatic glycols having up to 6 carbon atoms, cyclohexanediols, and aromatic diols of the formulae $HO—C_6H_4—C_6H_4—OH$ and $HO—C_6H_4—X—C_6H_4—OH$, wherein X is $—CH_2—$, $—C(CH_3)_2—$, $—c(CF_3)_2—$, $—O—$, $—S—$ or $—SO_2—$, and said other aliphatic, cycloaliphatic or aromatic dicarboxylic acids are selected from the group consisting of benzene dicarboxylic acids, naphthalene dicarboxylic acids, biphenyl-x,x'-dicarboxylic acids, diphenylacetylene-x,x'-dicarboxylic acids, stilbene-x,x'-dicarboxylic acids, cyclohexanedicarboxylic acids and $C_3$–$C_{19}$ alkanediacids.

20. A polyester film according to claim 19 wherein the mat outer layer (A) has a roughness, expressed via its $R_a$ value, in the range from 150 to 1000 nm, and wherein the value measured for gas flow is in the range from 1 to 50 s.

21. A polyester film according to claim 19, wherein the pigment system is $SiO_2$ particles in colloidal or chain-type form.

22. A polyester film according to claim 18, wherein the outer layer (A) also comprises, besides the thermoplastic polyester, up to 30% by weight, based on the total weight of the outer layer (A), of a polymeric component I which is a copolymer composed of the condensation product of the following monomers or, respectively, their derivatives capable of forming polyesters:
   e) from 65 to 95 mol % of isophthalic acid;
   f) from 0 to 30 mol % of at least one aliphatic dicarboxylic acid acid having the formula $HOOC(CH_2)_nCOOH$, where n is in the range 1 to 11;
   g) from 5 to 15 mol % of at least one sulfomonomer containing an alkali metal sulfonate group on the aromatic moiety of a dicarboxylic acid; and
   h) a copolymerizible aliphatic or cycloaliphatic glycol having from 2 to 11 carbon atoms, in the stoichiometric amount necessary to form 100 mol % of the condensation product;
wherein each of the percentages is based on the total amount of monomers forming component I.

23. A polyester film according to claim 18, wherein the mat outer layer (A) has a roughness, expressed via its $R_a$ value, in the range from 150 to 1000 nm, and wherein the value measured for gas flow is in the range from 1 to 50 s.

* * * * *